T. LUMSDEN.
VARIABLE SPEED MECHANISM FOR MOTOR VEHICLES.
APPLICATION FILED JULY 26, 1911.

1,031,723.

Patented July 9, 1912.
2 SHEETS—SHEET 1.

WITNESSES:
John C. Sanders
Leon Spring

INVENTOR:
Thomas Lumsden
BY
Wm. Wallace White ATTY.

T. LUMSDEN.
VARIABLE SPEED MECHANISM FOR MOTOR VEHICLES.
APPLICATION FILED JULY 26, 1911.
1,031,723.
Patented July 9, 1912.
2 SHEETS—SHEET 2.
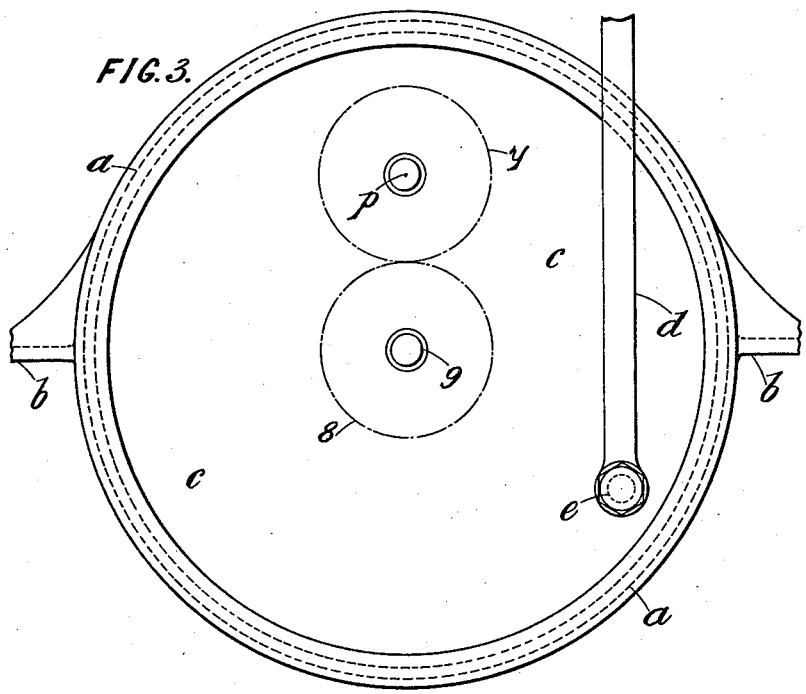
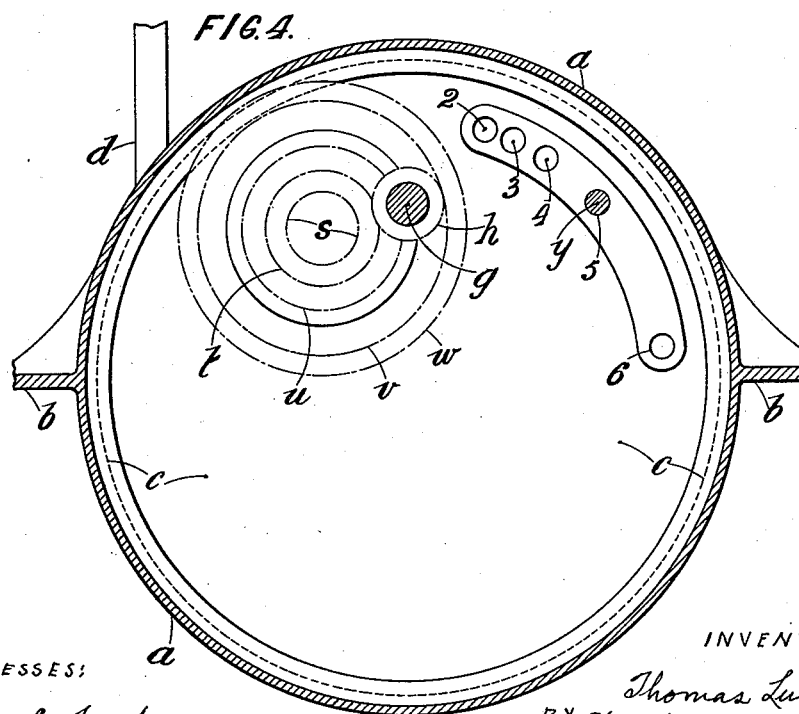

UNITED STATES PATENT OFFICE.

THOMAS LUMSDEN, OF GATESHEAD, ENGLAND.

VARIABLE-SPEED MECHANISM FOR MOTOR-VEHICLES.

1,031,723. Specification of Letters Patent. Patented July 9, 1912.

Application filed July 26, 1911. Serial No. 640,625.

*To all whom it may concern:*

Be it known that I, THOMAS LUMSDEN, subject of the King of Great Britain and Ireland, residing at 36 Saltwell View, Gateshead, in the county of Durham, England, have invented new and useful Improvements in Variable-Speed Mechanism for Motor-Vehicles, of which the following is a specification.

This invention relates to variable speed mechanism for motor vehicles, and has special reference to mechanism of the kind wherein a pinion on the driving shaft is adapted to mesh with one of a series of internally toothed gears on a compound annulus on the driven shaft, and the invention has for its object to provide an improved simple and efficient construction and arrangement of such mechanism.

The accompanying drawings illustrate by way of example one embodiment of the invention for giving four forward speeds and a reverse speed.

Figure 1:
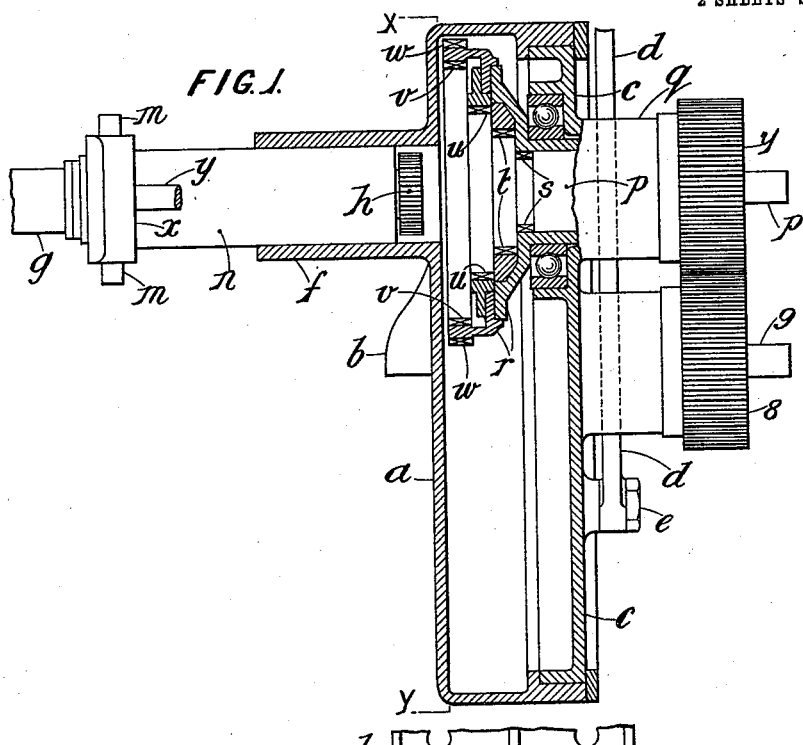
Figure 2:
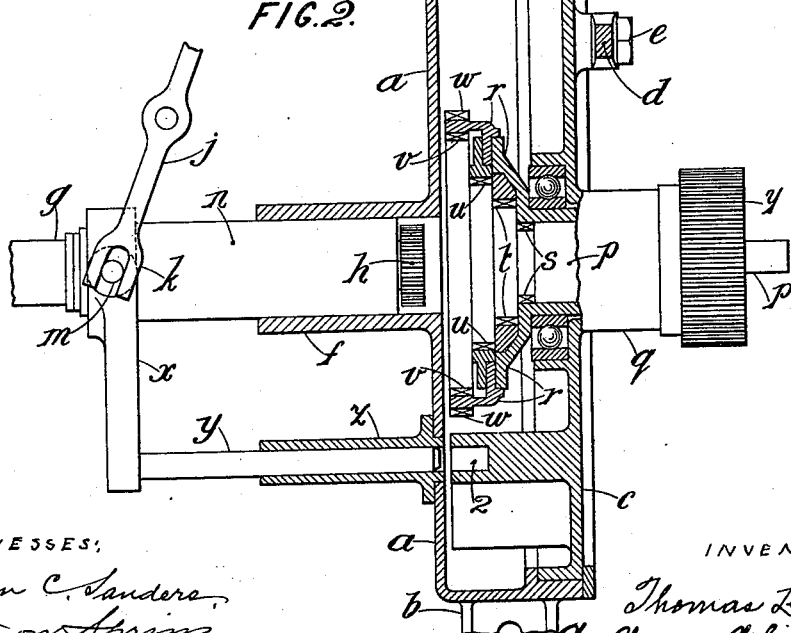

Of the drawings Figure 1 is a longitudinal section and Fig. 2 is a sectional plan of same. Fig. 3 is an end view of Fig. 1, and Fig. 4 is a section on the line X—Y in Fig. 1 showing the fourth or low gear in operation.

Referring to the drawings, $a$ is a fixed casing provided with lugs $b$, $b$ for attachment to the chassis or framing of the vehicle, and $c$ is a movable casing or disk mounted in the fixed casing $a$ and adapted to be partially rotated therein by a suitably operated link $d$ pivoted at $e$ to the movable casing or disk $c$. Eccentrically of the movable casing or disk $c$ the fixed casing $a$ supports in a bearing $f$ a driving shaft $g$ provided with a driving pinion $h$ and capable of axial movement in said bearing. The driving shaft $g$ may conveniently be moved axially in the bearing $f$ by means of a suitably operated pivoted lever $j$ (Fig. 2) having bifurcated ends $k$ engaging projections $m$, $m$ on a sleeve or bush $n$ mounted on the shaft $g$. The movable casing or disk $c$ supports, at the same degree of eccentricity with respect to it as the driving shaft $g$, a driven shaft $p$ mounted in a bearing $p$. The driven shaft $p$ carries a compound annulus $r$ on which are arranged internal gears $s$, $t$, $u$ and $v$ corresponding to the first or top, second, third and fourth or low speeds respectively.

In order to engage the driving pinion $h$ with any of the gears $s$, $t$, $u$ and $v$, the movable casing or disk $c$ is rotated in the fixed casing $a$ by the link $d$ to move the driven shaft $p$ laterally and bring the required gear into alinement with the pinion $h$ which is then moved into mesh with the gear by sliding the driving shaft $g$ axially by means of the lever $j$.

In order to reverse the rotation of the driven shaft $p$ the annulus $r$ may be provided with an external gear $w$ adapted to be engaged by the driving pinion $h$. The reversing means however forms no part of this invention, and, instead of the means above described and illustrated, I may as is well known employ a reversing pinion disposed at one side between the driving pinion $h$ and the gear $v$ and arranged so that when not in operation it does not mesh with either the driving pinion $h$ or the gear $v$. Any other suitable reversing means may be employed.

To insure the correct and ready alinement of the gears $s$, $t$, $u$ and $v$ with the driving pinion $h$ when the movable casing or disk $c$ is rotated to move the driven shaft $p$ laterally, the driving shaft $g$ or the sleeve or bush $n$ has mounted on it an arm $x$ carrying a selector rod or pin $y$ working in a guide $z$ on the fixed casing $a$ and adapted to engage recesses or holes 2, 3, 4, 5 and 6 in the movable casing or disk $c$ corresponding to the gears $s$, $t$, $u$, $v$ and $w$ respectively, said rod or pin $y$ being of such a length that it enters the recesses before the driving pinion $h$ meshes with the gears.

The motion of the driven shaft $p$ may be transmitted direct from it by a Cardan shaft in the ordinary manner, but, in order to avoid the obliquity of the Cardan shaft due to the lateral movement of the driven shaft $p$, the latter may be geared by gear wheels 7 and 8 to a shaft 9 mounted concentrically to the movable casing or disk $c$, and the motion of the shaft 9 may be transmitted by the usual Cardan shaft or in any suitable fashion. If desired the gear wheels 7 and 8 may be of unequal diameters so as to reduce the motion transmitted from the shaft $p$ to the shaft 9.

What I claim and desire to secure by Letters Patent is:—

In a variable speed mechanism for motor vehicles, the combination of, a fixed casing, a movable casing or disk mounted in said fixed casing and adapted to be partially rotated therein, a driving shaft mounted in said fixed casing eccentrically to said movable casing or disk and capable of axial movement, a driving pinion on said driving shaft, a driven shaft mounted in said movable casing or disk at the same degree of eccentricity thereto as said driving shaft, change speed gears carried by said driven shaft and adapted when said movable casing or disk is partially rotated to be moved laterally into alinement with said pinion, means for moving said driving shaft axially to mesh said driving pinion with any one of said gears, and a shaft mounted concentrically to the center about which said movable casing or disk is partially rotated and geared to said driven shaft.

In testimony whereof I have signed my name to this specification in the presence of two subscribing witnesses.

THOMAS LUMSDEN.

Witnesses:
EDMUND WARD PATTISON,
HERBERT HOWARD.

Copies of this patent may be obtained for five cents each, by addressing the "Commissioner of Patents, Washington, D. C."